Figure 1:
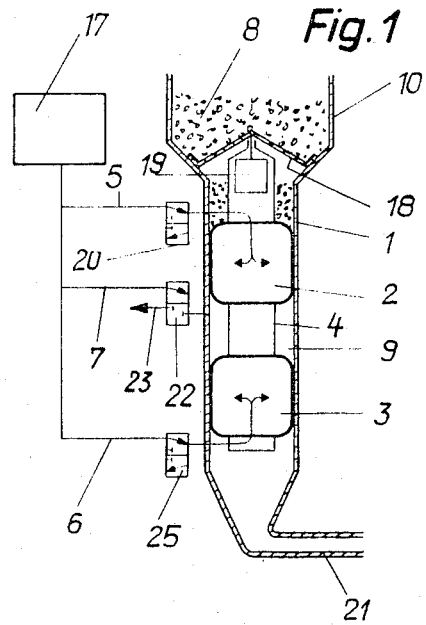

Feb. 14, 1967   W. BLEULER   3,303,974
CHARGING AND/OR DISCHARGING DEVICE
Filed April 21, 1965   4 Sheets-Sheet 1

Feb. 14, 1967 W. BLEULER 3,303,974
CHARGING AND/OR DISCHARGING DEVICE
Filed April 21, 1965 4 Sheets-Sheet 2

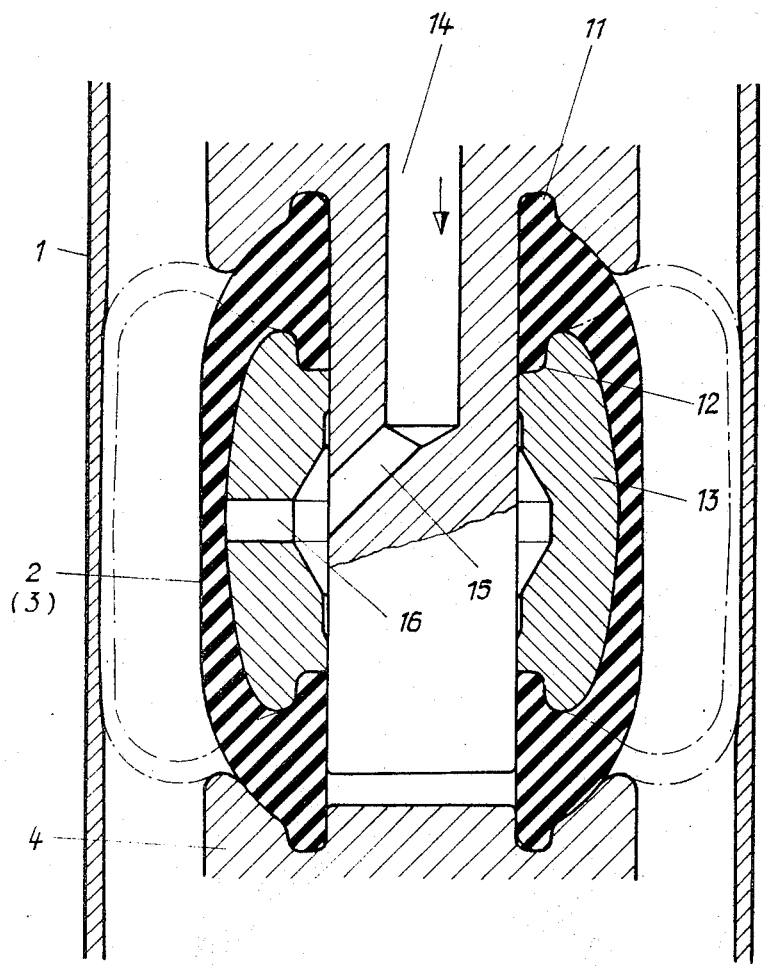

United States Patent Office 3,303,974
Patented Feb. 14, 1967

3,303,974
CHARGING AND/OR DISCHARGING DEVICE
Willy Bleuler, 1 Witellikerstrasse, Zollikon,
Zurich, Switzerland
Filed Apr. 21, 1965, Ser. No. 449,724
Claims priority, application Switzerland, May 19, 1964,
6,459/64
7 Claims. (Cl. 222—445)

The present invention relates to a charging and/or discharging device, particularly in a plant for the conveying of granular and papescent material, e.g. concrete, in the form of a mixture of gravel and cement as well as in the form of moistened finished concrete.

The primary object of the invention is the provision of a device for the faultless charging of the material to be conveyed and for obviating the need for a mechanically operated conveyer, or charging means subject to wear and tear. Another object of the invention is the provision of a device for sluicing a granular or papescent material into or out of a pressurized container.

With this and other objects in view, which will become apparent later from this specification and the accompanying drawings, I provide a charging and/or discharging device, particularly in a plant for the conveying of granular or papescent material comprising in combination: a tube and at least two resilient bladders arranged in series in said tube and means for inflating and deflating said bladders independently, said bladders when inflated contacting the internal wall surface of said tube.

These and other features of my said invention will be clearly understood from the following description of an embodiment thereof, given by way of example with reference to the accompanying drawings, in which:

FIGS. 1–7 are diagrammatic longitudinal sections of a charging device according to the present invention in various working positions thereof, FIG. 8 is a longitudinal section of an internally positioned bladder on a larger scale.

The device illustrated comprises two resilient bladders 2 and 3 arranged in a tube 1 in series at a certain spacing from one another on a common carrier 4. Each of the bladders is connected with a pipe 5 and 6, respectively, through which compressor air may be blown into said bladders by a compressor 17. A further compressed air pipe 7 issues in the intermediate space 9 between the two bladders 2, 3. A charging hopper 10 is provided for introducing the material to be conveyed. The charging device issues directly into a pneumatic conveyer pipe 21, through which the material is conveyed to the site of consumption.

Hereinafter the manner of operation of the device and subsequently the structural design of the bellows will be described.

Figure 2:
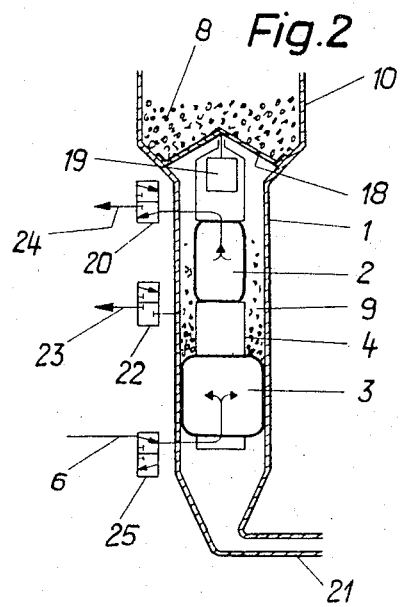
Figure 3:
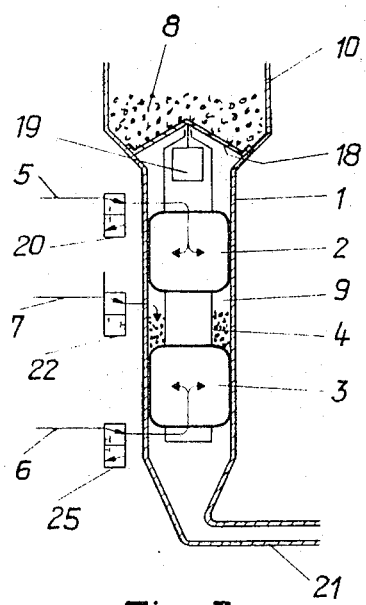
Figure 4:
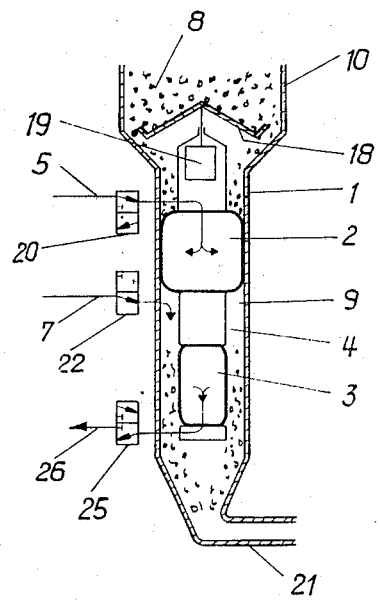

In the position according to FIG. 1 both bladders 2 and 3 have been supplied with compressed air and fit snugly against the inner wall surface of the tube 1 so as to form a seal. The material to be conveyed is placed on the upper bladder 2 through the charging hopper 10 by means of a dosing means 18, which can be raised and lowered e.g. by a driving unit 19. As soon as the amount sufficient for one conveying cycle has accumulated on the upper bladder 2, air is vented from the latter through a pipe 24 by readjusting a slide valve 20, whereafter said bladder shrinks as shown in FIG. 2. The material previously deposited thereon then drops into the intermediate space 9 and then lies on the lower resilient bladder 3, which is still under pressure in the same manner as in the position according to FIG. 1. The excess air escapes from the intermediate space 9 through a control slide valve 22 and a pipe 23 into the open air. In the third stage, compressed air is again supplied to the upper bladder 2 by re-adjusting the slide valve 20 (see FIG. 3), so that said bladder expands again and firmly contacts the inner wall surface of pipe 1. Likewise the lower bladder 3 firmly contacts the inner wall surface of said pipe under the action of the compressed air still supplied to the same. Compressed air is then supplied to the intermediate space 9 between the two bladders through pipe 7 and slide valve 22, and after readjustment of a slide valve 25 venting is effected of the lower bladder 3 through a pipe 26 (FIG. 4), whereby the material conveyed is blown out of the intermediate space 9 and is conveyed through the distributor pipe 21 to the site of consumption. At the same time a new predetermined amount of material to be conveyed is allowed to drop from the hopper 10 upon the upper bladder 2 by actuating the dosing device 18, as shown in FIG. 4. Thereafter compressed air is again supplied to the lower bladder 3 and the device is brought back to the position according to FIG. 1, whereafter the whole cycle is repeated. In practice a few seconds only are required for performing the four stages of operation according to FIGS. 1 to 4. The air supply to the intermediate space may be interrupted by actuating the control slide valve 22 even before deflating the lower bladder, so that the conveying is effected merely by the expansion of the air contained in the intermediate space. The air supply to said intermediate space may alternatively be continued for a certain time after the venting of the lower bladder and thus assist the conveying of the material.

Figure 5:
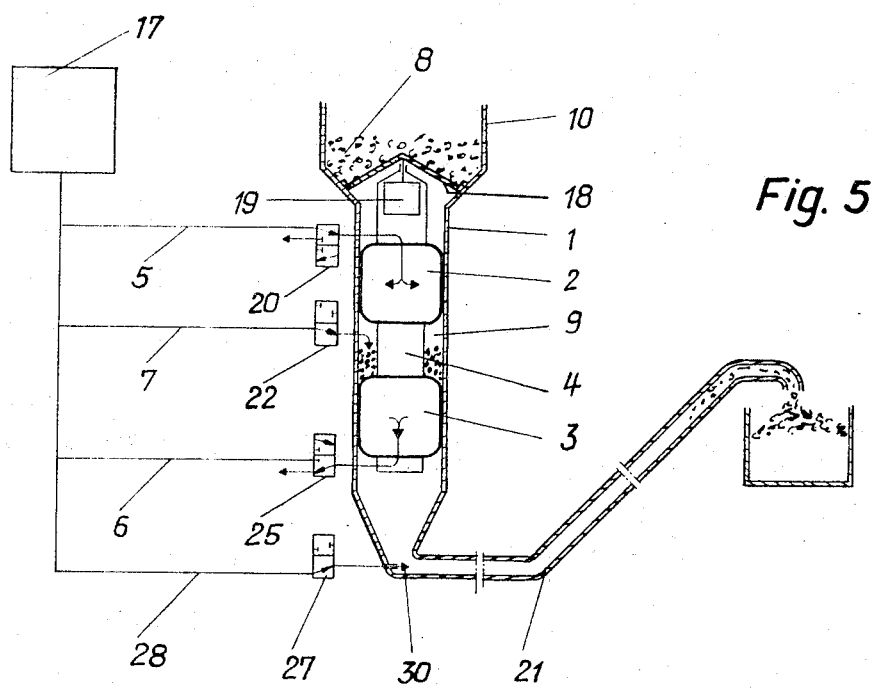

It is moreover possible, as shown in FIG. 5, to conduct air from the compressor 17 through a pipe 28, a control slide valve 27 and an additional nozzle 30 into the conveying pipe 21, thus to assist the conveying of the material. Through this nozzle 30 compressed air may be introduced continuously or periodically into the pipe 21 by appropriately controlling the slide valve 27.

Figure 6:
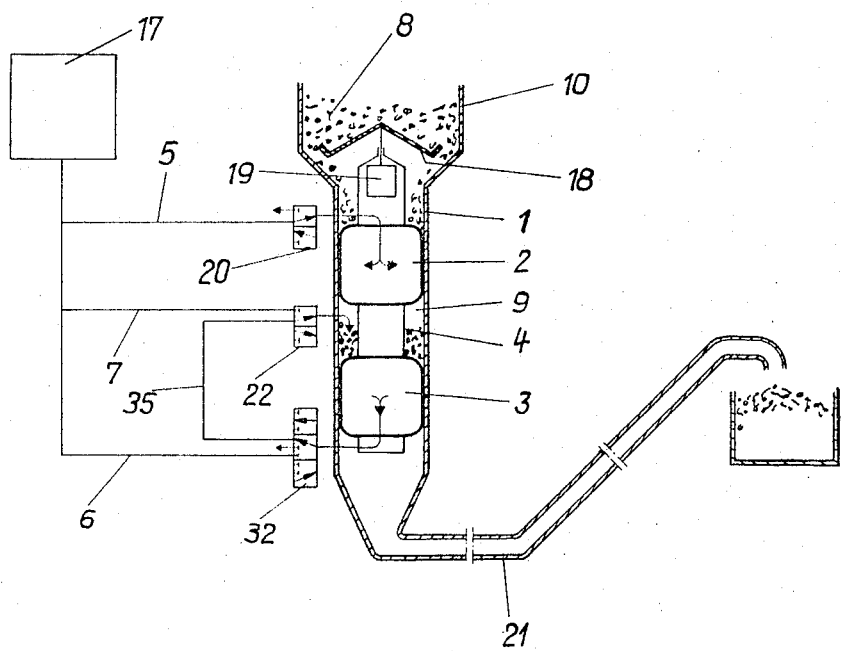
Figure 7:
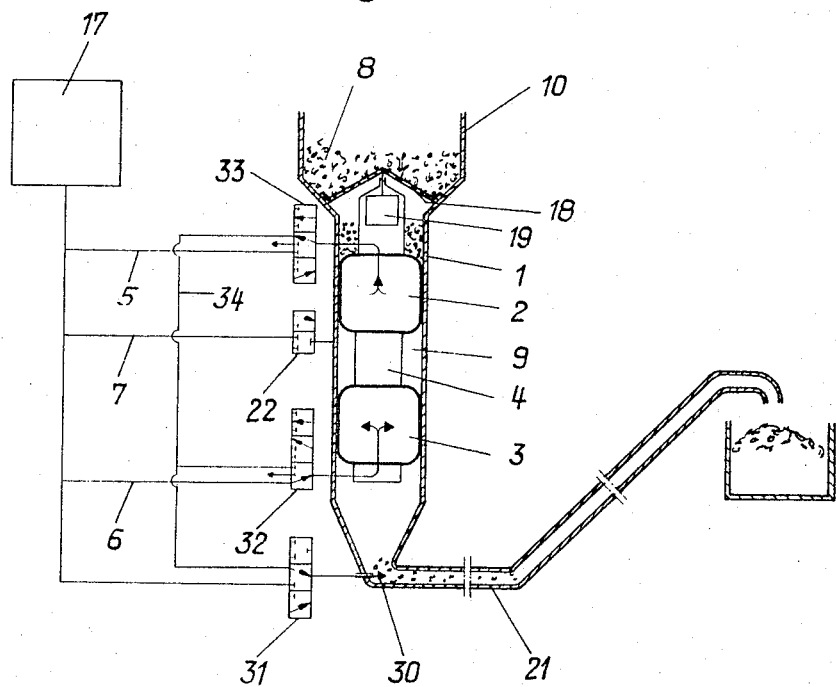

The control of the air supply to the bladders may alternatively be effected in accordance with FIG. 6 in such a manner that the exhaust air from the lower bladder 3 is introduced through a control slide valve 32 and a pipe 35 into the intermediate space 9. Moreover there exists the possibility of supplying compressed air from the bladder 2 through a control slide valve 33 and a pipe 34 to the nozzle 30, as shown in FIG. 7. By appropriate control of the slide valves 33 and 32 compressed air may also be supplied to the nozzle 30 from the bladder 3.

Although the device described is particularly suitable for the charging of material of the kind referred to into a pneumatic conveyor plant, it may alternatively serve for sluicing material to be conveyed from or into containers under pressure.

The structural design of a bladder of the internally positioned type is illustrated in FIG. 8. The same shows the carrier 4 and one of the identically constructed bladders 2 or 3, respectively, which are made preferably of rubber or an elastic synthetic substance. The bladder illustrated is of toroidal shape and reaches with flanges 11 and 12 under corresponding guides of the carrier 4 and a ring 13 fixedly mounted thereon. The bladder is shown in full lines in the deflated position, and in chain-dotted lines in the fully inflated position. The air supply is effected through an axial cavity 14 of the carrier 4 and through connecting lines 15, 16. The use of an elastic substance for the bladders allows a snug contact of the same with the inner wall surface of the tube 1, even when the latter is fouled by adhering material such as cement or gravel. The carrier 4 may, but need not, be directly connected with the tube 1.

What I claim as my invention and desire to secure by Letters Patent, is:

1. A device for the conveying of granular or papescent material comprising a tube, a plurality of resilient bladders arranged in series in said tube and being inflatable for engagement with the tube and deflatable independently from one another, a coaxial carrier arranged in the interior of said tube, said bladders being attached to the outer surface of said carrier, said carrier comprising first and second spaced bodies in the region of each bladder, a supporting ring mounted on one of the bodies, each said bladder including at either end thickened portions having opposed projections thereon which positively engage in corresponding recesses provided in said carrier and said supporting ring.

2. A device as claimed in claim 1, wherein each of said bladders is of toroidal shape.

3. A device as claimed in claim 2, wherein each of said bladders has in the deflated condition substantially the outer diameter of said carrier.

4. A device as claimed in claim 10 wherein the recesses in each ring are at opposite sides thereof and face respective recesses in said first and second bodies, the projections on the portions of each bladder being engaged in the recesses of the associated supporting ring and in respective recesses of said first and second bodies.

5. A device as claimed in claim 4 wherein said projections extend parallel to the outer surface of the carrier and in opposite directions at each of said thickened ends.

6. A device as claimed in claim 5 wherein said recesses in the ring are undercut therein in the region proximate the outer surface of the carrier.

7. A device as claimed in claim 6 wherein said bodies of the carrier include portions adjacent the recesses therein which overlie the thickened ends of the associated bladder along the outer surface thereof and project inwardly therealong towards one another.

References Cited by the Examiner

UNITED STATES PATENTS

| 2,723,057 | 11/1955 | Golden | 222—447 X |
| 2,889,892 | 6/1959 | Schaub et al. | 222—442 X |
| 2,953,281 | 9/1960 | Johnson | 222—450 X |
| 3,095,018 | 6/1963 | Moreland | 222—447 X |

FOREIGN PATENTS 80,613  6/1951  Czechoslovakia.

ROBERT B. REEVES, *Primary Examiner.*

HADD S. LANE, *Examiner.*